US008044593B2

(12) United States Patent
Price

(10) Patent No.: US 8,044,593 B2
(45) Date of Patent: Oct. 25, 2011

(54) METHODS AND SYSTEMS FOR CONTROLLING THE ACTIVATION OF AGRICULTURAL VEHICLE LIGHTING

(75) Inventor: Trail Price, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 384 days.

(21) Appl. No.: 12/271,110

(22) Filed: Nov. 14, 2008

(65) Prior Publication Data

US 2010/0123413 A1 May 20, 2010

(51) Int. Cl.
*B60Q 1/26* (2006.01)

(52) U.S. Cl. .......................................... 315/77; 315/291

(58) Field of Classification Search .............. 315/76-78, 315/80, 291, 307, 224

See application file for complete search history.

(56) References Cited

U.S. PATENT DOCUMENTS 4,097,783 A 6/1978 Hathaway
4,258,295 A 3/1981 Siglock
6,031,340 A * 2/2000 Brosius ..................... 315/227 R
6,320,329 B1 * 11/2001 Wacyk .......................... 315/291
6,407,515 B1 * 6/2002 Hesler et al. .................. 315/294
6,445,135 B2 * 9/2002 Kinoshita ...................... 315/119
6,608,451 B2 * 8/2003 Collins ......................... 315/276
6,798,152 B2 * 9/2004 Rooke et al. .............. 315/209 R
2002/0118547 A1 8/2002 Holthaus

FOREIGN PATENT DOCUMENTS

WO WO2010/055394 5/2010

* cited by examiner

*Primary Examiner* — Douglas W Owens
*Assistant Examiner* — Minh D A

(57) ABSTRACT

An agricultural vehicle lighting system includes a plurality of HID lamps and a lighting controller. The HID lamps are configured to be mounted to the agricultural vehicle and powered by an existing electrical circuit of the agricultural vehicle. The lighting controller controls activation of the lamps and is configured to initially activate a first set of the lamps and to subsequently activate a second set of the lamps once it determines that the electrical circuit has the capacity to safely handle both the first and second sets of the lamps. The lighting controller may determine that the electrical circuit has sufficient capacity by determining when current drawn from the first set of the lamps drops below a threshold current level. Alternatively, the lighting controller may determine that the electrical circuit has sufficient capacity by delaying activation of the second set of the lamps for a time period corresponding to a current decay characteristic of the lamps.

22 Claims, 6 Drawing Sheets

METHODS AND SYSTEMS FOR CONTROLLING THE ACTIVATION OF AGRICULTURAL VEHICLE LIGHTING

BACKGROUND

1. Field

Embodiments of the present invention relate to agricultural vehicles. More particularly, embodiments of the invention relate to methods and systems for controlling the activation of agricultural vehicle lighting.

2. Related Art

Tractors and other agricultural vehicles are often equipped with auxiliary electrical circuits for powering optional or after-market electrical components such as rear-mounted lighting systems. Many agricultural vehicle lighting systems use high-intensity discharge (HID) lamps such as xenon, mercury vapor, high-pressure sodium, and metal halide lamps because they produce a much larger quantity of light with a relatively smaller bulb when compared to fluorescent and incandescent lamps. HID lamps also last much longer than many other types of lamps and produce a white light that more closely approximates the color of natural daylight.

Unfortunately, however, HID lamps draw a spike or peak of current at start-up before settling to a steady state current level after a few seconds of operation. For example, one type and size of HID lamp draws approximately 10 amps at start-up, 5 amps after 10 seconds, and only 3 amps after 30 seconds. This is a problem when such lamps are powered by auxiliary electrical circuits, because these circuits are typically designed to carry a relatively low maximum current. For example, many agricultural vehicles are equipped with auxiliary electrical circuits with wires and fuses or circuit breakers rated for only 20 amps. To avoid blowing these fuses or overheating the wires, only two HID lamps may be attached to each circuit. One obvious solution to this problem is to provide higher capacity wires and fuses, but this is not practical for existing agricultural vehicles.

Accordingly there is a need for an improved system and method for powering HID lamps and similar lamps installed on agricultural vehicles.

SUMMARY

Embodiments of the present invention solve the above-described problems and/or other problems by providing improved methods and systems for powering HID lamps in agricultural vehicles.

One embodiment of the invention is an agricultural vehicle lighting system comprising a plurality of HID lamps and a lighting controller. The HID lamps are configured to be mounted to the agricultural vehicle and powered by an existing electrical circuit of the agricultural vehicle. The lighting controller controls activation of the lamps and is configured to initially activate a first set of the lamps and to subsequently activate a second set of the lamps once it determines that the electrical circuit has the capacity to safely handle both the first and second sets of lamps. In one embodiment, the lighting controller determines that the electrical circuit has sufficient capacity by determining when current drawn from the first set of lamps drops below a threshold current level. In another embodiment, the lighting controller determines that the electrical circuit has sufficient capacity by delaying activation of the second set of lamps for a time period corresponding to a current decay characteristic of the lamps.

These and other important aspects of the present invention are described more fully in the detailed description below.

The invention is not limited to the particular methods and systems described herein. Other embodiments may be used and/or changes to the described embodiments may be made without departing from the scope of the claims that follow the detailed description.

BRIEF DESCRIPTION OF THE DRAWINGS

Embodiments of the present invention are described in detail below with reference to the attached drawing figures, wherein.

Figure 1:
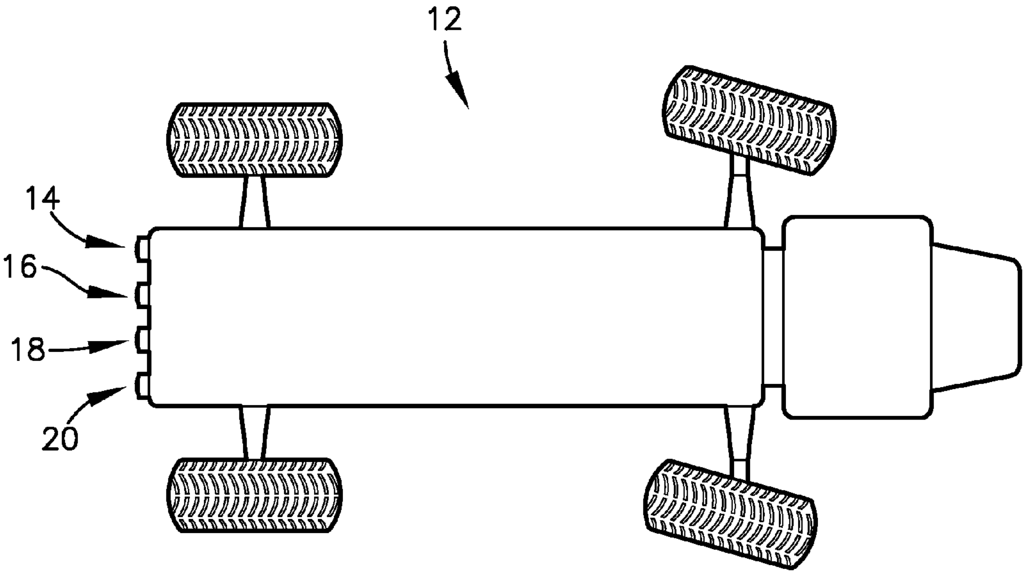
FIG. 1 is a schematic plan view of an agricultural vehicle in which the lighting system of the present invention may be used.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Embodiments of the present invention provide a lighting system 10 that may be mounted on or in a vehicle 12. The vehicle 12 may be an agricultural vehicle, automobile, all-terrain vehicle, or any other type of land-based vehicle. In a particular embodiment, the vehicle 12 is a tractor, combine, windrower, applicator, truck or any other self-propelled vehicle primarily used for farming or other agricultural purposes.

Figure 2:
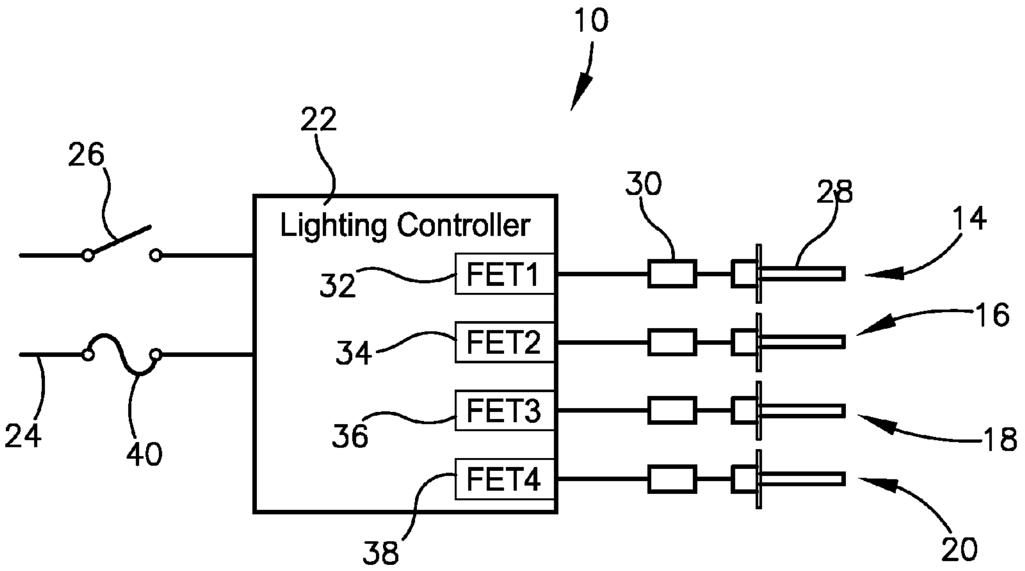
FIG. 2 is a block diagram illustrating an embodiment of the lighting system.

An embodiment of the lighting system 10 illustrated in FIG. 2 includes a plurality of HID lamps 14, 16, 18, 20, a lighting controller 22 for controlling activation of the lamps, a power source 24 for powering the lighting controller 22 and the lamps 14-20, and a manually operable switch 26 for selectively triggering activation of the lamps.

The lamps 14-20 may be any other conventional HID or similar type lamps. In one embodiment, the lamps are 35 watt xenon HID lamps manufactured by Sylvania. Each lamp includes an HID bulb or tube 28 and an associated ballast 30. The lighting system 10 may include any number of lamps, and the lamps may be mounted anywhere on or in the vehicle 12. In one embodiment illustrated in FIG. 1, the lighting system 10 includes four HID lamps 14-20 mounted to a rear fender of the vehicle 12.

The lighting controller 22 can be implemented in hardware, software, firmware, or a combination thereof. An exemplary embodiment of the lighting controller 22 may comprise any number of processors, controllers, integrated circuits, programmable logic devices, or other control devices and a plurality of integral or external switches 32, 34, 36, 38, one for each HID lamp 14-20. The lighting controller 22 may also include resident or external memory for storing data and other information. The lighting controller 22 may be a stand-alone component or may be integrated into other control devices of the agricultural vehicle such as a vehicle lighting system. The lighting controller 22 may also be directly or indirectly coupled with the other electrical or computing components in the vehicle through wired or wireless connections to enable information to be exchanged between the various components.

The lighting controller 22 may implement a computer program and/or code segments to perform the functions described herein. The computer program may comprise an ordered listing of executable instructions for implementing logical functions in the lighting controller 22 such as the steps illustrated in FIGS. 5-7 and described below. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The switches 32-38 may be any devices capable of switching power to the HID lamps 14-20 under direction of the lighting controller 22. In one embodiment, the switches are smart field-effect transistors (SmartFETs) such as those manufactured by Freescale Semiconductor Inc. As explained in more detail below, the lighting controller 22 can read or otherwise obtain the magnitude of current delivered by each of the SmartFETs 32-38 to its corresponding lamp 14-20.

The power source 24 may be any conventional power supply elements such as batteries, battery packs, etc. The power source 24 may also comprise power conduits, connectors, and receptacles operable to receive batteries, battery connectors, or power cables. In one embodiment, the power source 24 is an auxiliary electrical circuit installed in the agricultural vehicle 12 during its manufacture. The auxiliary electrical circuit is protected by a fuse, circuit breaker, or other overcurrent protection device 40 and is rated to carry a maximum current such as 20 amps.

The switch 26 may be any conventional input device that permits an operator to selectively activate the HID lamps 14-20 such as a rotary switch or pushbutton switch. The switch 26 may be wired in series between the power source 24 and the lighting controller 22 or may be wired to provide only a control signal to the lighting controller as illustrated in FIG. 2.

Figure 3:
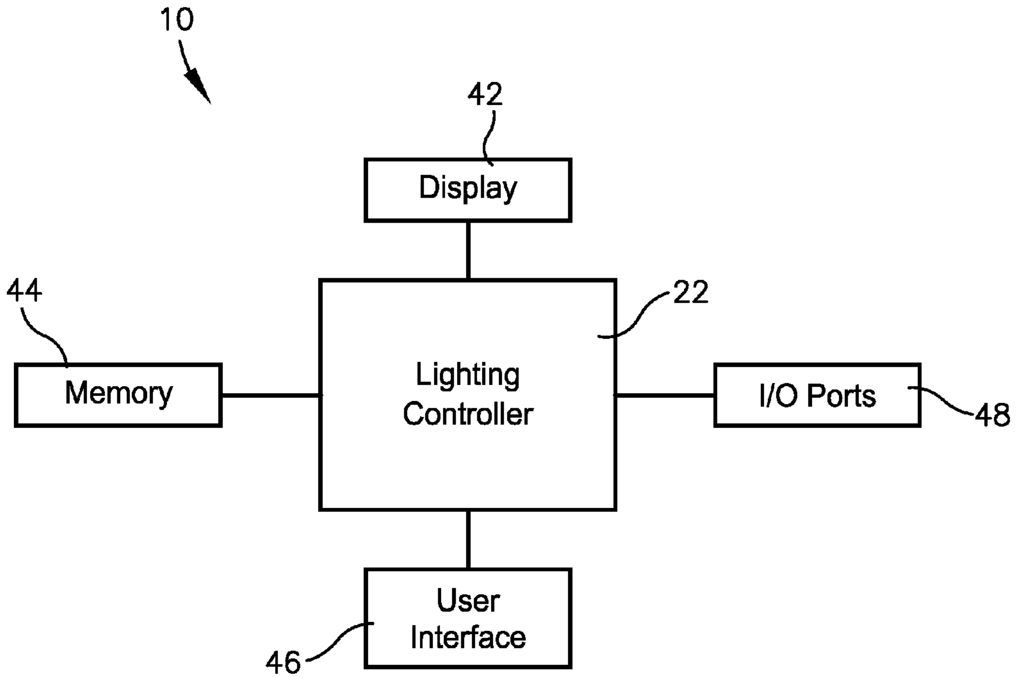
FIG. 3 is a block diagram illustrating another embodiment of the lighting system.

As illustrated in FIG. 3, another embodiment of the lighting system 10 may also comprise or be connected to a display 42, memory 44, a user interface 46, and one or more I/O ports 48. The display 42 may be used to display various information corresponding to the vehicle 12 and the lighting controller 22, such as the status of the lamps 14-20. The display 42 may comprise conventional black and white, monochrome, or color display elements including CRT, TFT, LCD, and/or plasma display devices. Preferably, the display 42 is of sufficient size to enable a user to easily view it while driving the vehicle 12. The display 42 may be integrated with the user interface 46, such as in embodiments where the display 42 is a touch-screen display to enable the user to interact with it by touching or pointing at display areas to provide information to the guidance system 10.

The memory 44, may be integral with the lighting controller 22, stand-alone memory, or a combination of both. The memory may include, for example, removable and non-removable memory elements such as RAM, ROM, flash, magnetic, optical, USB memory devices, and/or other conventional memory elements. The memory 44 may store various data associated with the operation of the lighting controller 22, such as the computer program and code segments mentioned above, or other data for instructing the lighting controller 22 and system elements to perform the steps described herein. The various data stored within the memory 44 may also be associated within one or more databases to facilitate retrieval of the information.

The user interface 46 permits a vehicle operator or other person to operate and/or program the lighting controller 22. The user interface 46 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the user interface 46 may comprise wired or wireless data transfer elements such as a removable memory including the memory 44, data transceivers, etc., to enable the vehicle operator and other devices or parties to remotely interface with the lighting controller 22.

The I/O ports 48 permit data and other information to be transferred to and from the lighting controller 22. The I/O ports 48 may include a TransFlash card slot for receiving removable TransFlash cards and a USB port for coupling with a USB cable connected to another control device such as a personal computer. Navigational software, cartographic maps, and other data and information may be loaded in the lighting controller via the I/O ports 48.

Some of the components illustrated in FIGS. 2 and 3 and described herein may be housed together in a protective enclosure. However, the components need not be physically connected to one another since wireless communication among the various components is possible and intended to fall within the scope of the present invention.

In operation, the lighting controller 22 controls activation of the lamps 14-20 in such a way as to prevent blowing of the fuse 40 and/or overheating of the wires of the auxiliary electrical circuit 24. To do so, the lighting controller 22 is configured to initially activate a first set of the lamps and to subsequently activate a second set of the lamps once it determines that the electrical circuit 24 has the capacity to safely handle both the first and second sets of the lamps. In one embodiment, the lighting controller 22 determines that the electrical circuit 24 has sufficient capacity by determining when current drawn from the first set of the lamps drops below a threshold current level. In another embodiment, the lighting controller 22 determines that the electrical circuit 24 has sufficient capacity by delaying activation of the second set of the lamps for a time period corresponding to a current decay characteristic of the lamps. These and other embodiments of the invention are described in more detail below.

Figure 5:
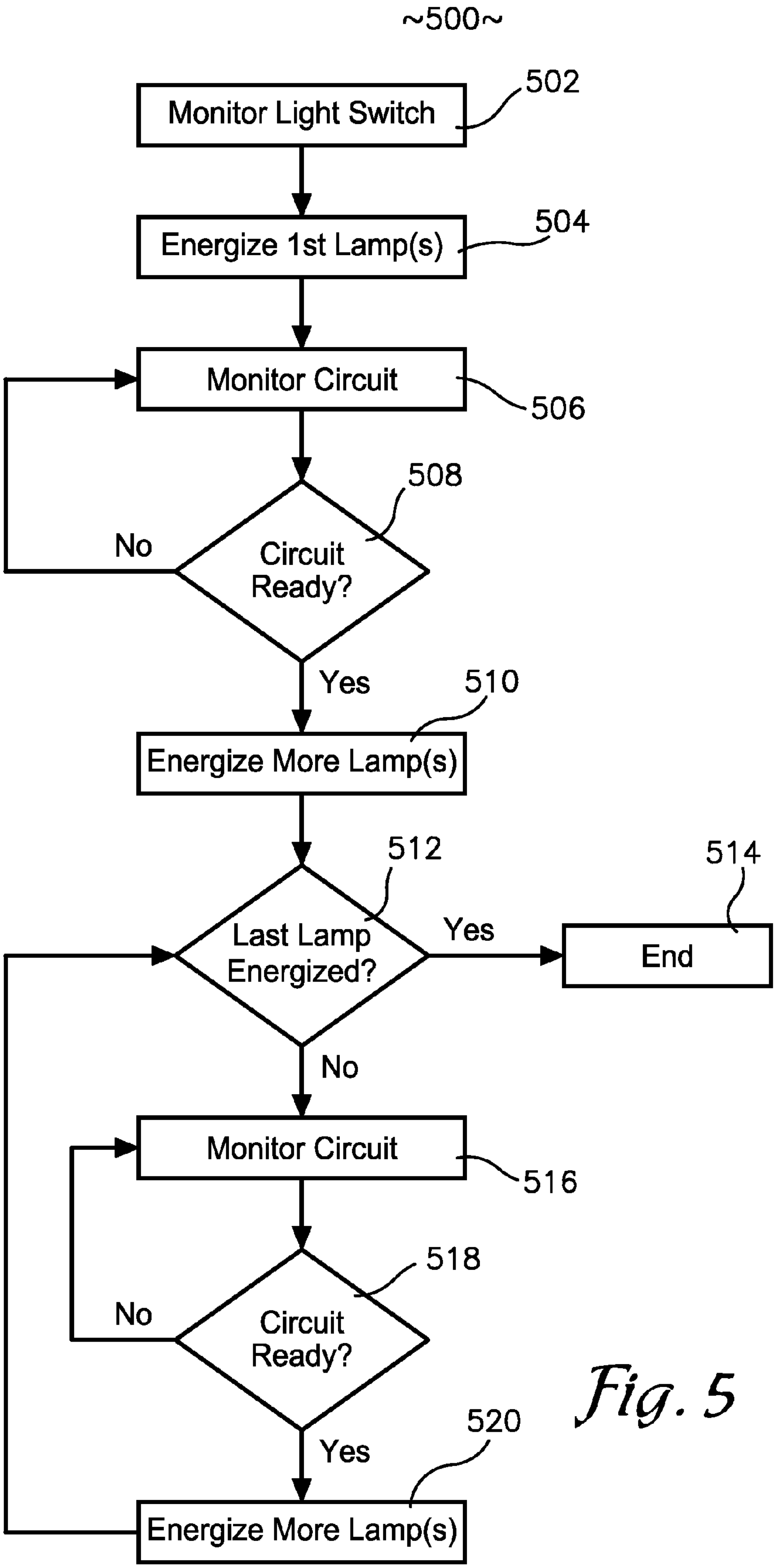
FIG. 5 is a flow chart illustrating selected steps of a method in accordance with embodiments of the invention.
Figure 6:
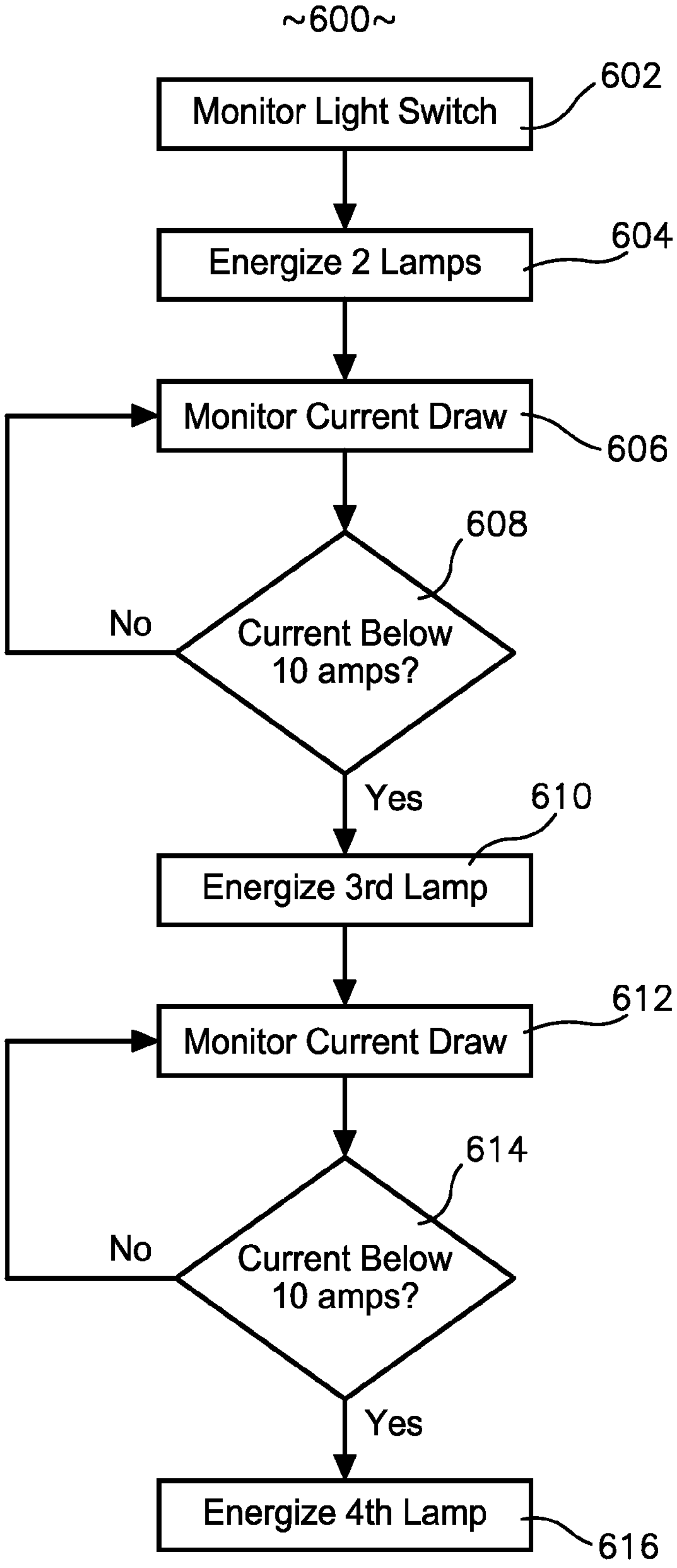
FIG. 6 is another flow chart illustrating selected steps of a method in accordance with embodiments of the invention.
Figure 7:
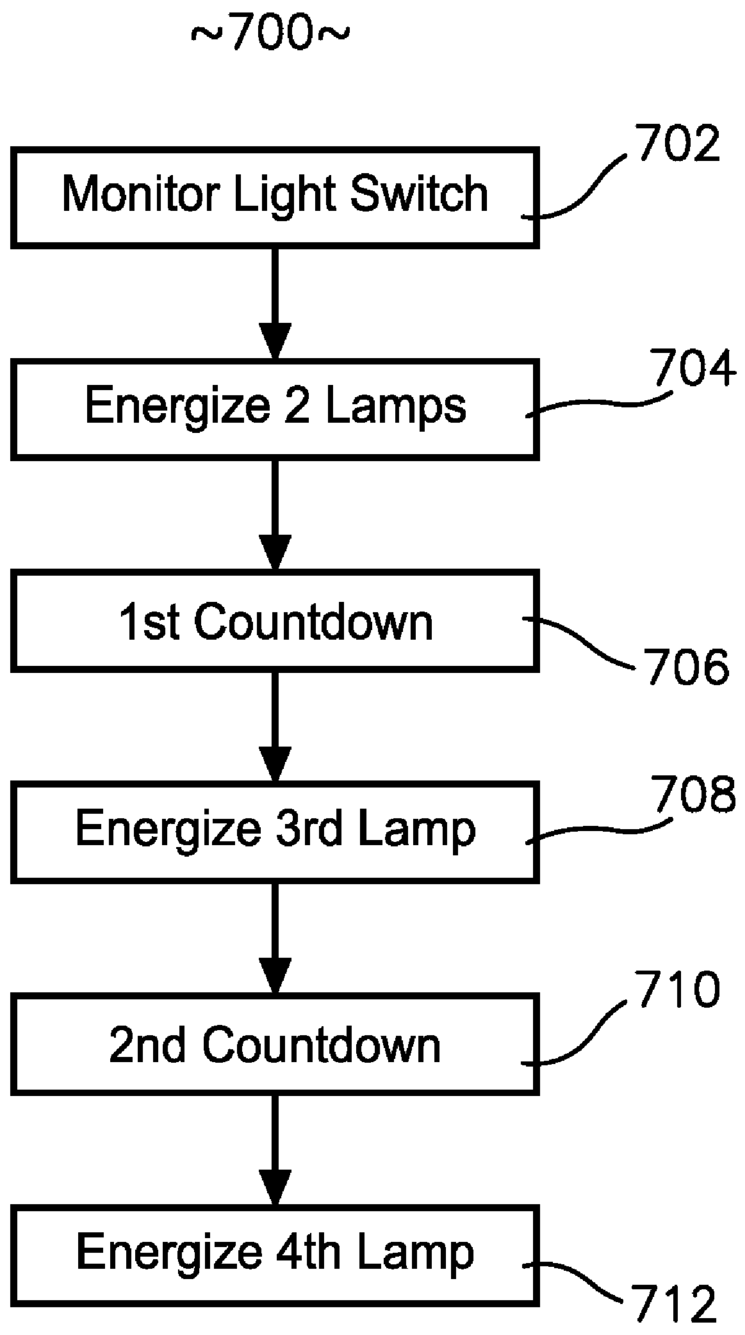
FIG. 7 is another flow chart illustrating selected steps of a method in accordance with embodiments of the invention.

FIGS. 5-7 illustrate steps in exemplary methods 500, 600, and 700 of using the lighting system 10. Some or all of the steps may be implemented by the lighting controller 22, by computer programs stored in or accessed by the lighting controller 22, or by other components in communication with the lighting controller 22. The particular order of the steps illustrated in FIGS. 5-7 and described herein can be altered without departing from the scope of the invention. For example, some of the illustrated steps may be reversed, combined, or even removed entirely.

Method 500 shown in FIG. 5 stages or sequences activation of the lamps 14-20 in order to power all of the lamps with a single power source such as the auxiliary electrical circuit 24 without blowing the fuse 40 and/or overheating the wires in the circuit. The method 500 begins at step 502 where the lighting controller 22 monitors or senses activation of the switch 26. Once the switch 26 is closed, the lighting controller 22 energizes a first set of the lamps in step 504. The first set of lamps may comprise one or more of the lamps, and in one embodiment, comprises the lamp 14 and the lamp 16.

Steps 506 and 508 then determine if the auxiliary electrical circuit 24 has capacity to handle more of the lamps. Specific embodiments of these steps are disclosed in methods 600 and 700 below. If the circuit 24 does not have capacity, step 508 returns to step 506. If the circuit does have capacity, the method proceeds to step 510 where the lighting controller 22 energizes a second set of the lamps. In one embodiment, the second set of lamps includes only lamp 18.

Step 512 then determines if all of the lamps have been energized. If so, the method ends at step 514. If some of the lamps have not been energized, the method proceeds to steps 516 and 518 to determine if the auxiliary circuit 24 has capacity to handle more lamps. If the circuit 24 does not have capacity, step 518 returns to step 516. If the circuit does have capacity, the method proceeds to step 520 where the lighting controller energizes a third set of the lamps. In one embodiment, the third set of lamps includes only lamp 20. The method then returns to step 512 again to determine if all of the lamps have been energized and ends at step 514.

Method 600 shown in FIG. 6 provides a particular way of staging or sequencing activation of the lamps 14-20 by monitoring the current draw of the lamps. The method 600 begins at step 602 where the lighting controller 22 monitors or senses activation of the switch 26. Once the switch 26 is closed, the lighting controller 22 energizes a first set of the lamps in step 604. The first set of lamps may comprise one or more of the lamps, and in one particular embodiment, comprises the lamp 14 and the lamp 16.

Steps 606 and 608 then determine if the auxiliary electrical circuit 24 has capacity to handle more of the lamps. This is done by monitoring the current draw of the first set of lamps and comparing the current draw to a threshold current level. For example, as described above, one type of HID lamp draws approximately 10 amps at start-up and 3 amps during steady state operation. Thus, when lamps 14 and 16 are first activated, they together draw approximately 20 amps from the circuit 24. The lighting controller 22 reads or otherwise obtains the amount of current delivered through the FETs 32 and 34 and determines when it drops below a threshold level, which in one embodiment is 10 amps. Once the current draw on the circuit 24 is below 10 amps, the method proceeds to step 610 where the lighting controller 22 energizes a second set of lamps, which in one embodiment is lamp 18.

The method then proceeds to steps 612 and 614 to again determine if the auxiliary circuit 24 has capacity to handle more lamps. This is done by monitoring the combined current draw of the lamps 14, 16, and 18 as sensed by the FETs 32, 34, 36 and comparing the current draw to a threshold current level, which in one embodiment is 10 amps. Once the combined current draw on the circuit 24 is again below the threshold level, the method proceeds to step 616 where the lighting controller 22 energizes lamp 20.

The particular threshold current levels in steps 608 and 614 are examples only and may be replaced with other threshold current levels. Similarly, the order of which the lamps are activated may be changed.

Method 700 shown in FIG. 7 provides another way of staging or sequencing activation of the lamps 14-20. This embodiment does not directly consider the current delivered to the lamps 14-20 by the FETs 32-38, but instead activates the lamps in accordance with a pre-determined time sequence based on known current decay characteristics of the lamps. As mentioned above, a particular type and size of HID lamp draws approximately 10 amps at start-up. Applicant has discovered that the current requirement for this type of lamp decays to approximately 5 amps after 10 seconds and to approximately 3 amps after 30 seconds. Method 700 takes advantage of these current decay characteristics to stage activation of the lamps.

The method 700 begins at step 702 where the lighting controller 22 monitors or senses activation of the switch 26. Once the switch 26 is closed, the lighting controller 22 energizes a first set of the lamps in step 704. The first set of lamps may comprise one or more of the lamps, and in one particular embodiment, comprises the lamp 14 and the lamp 16.

Figure 4:
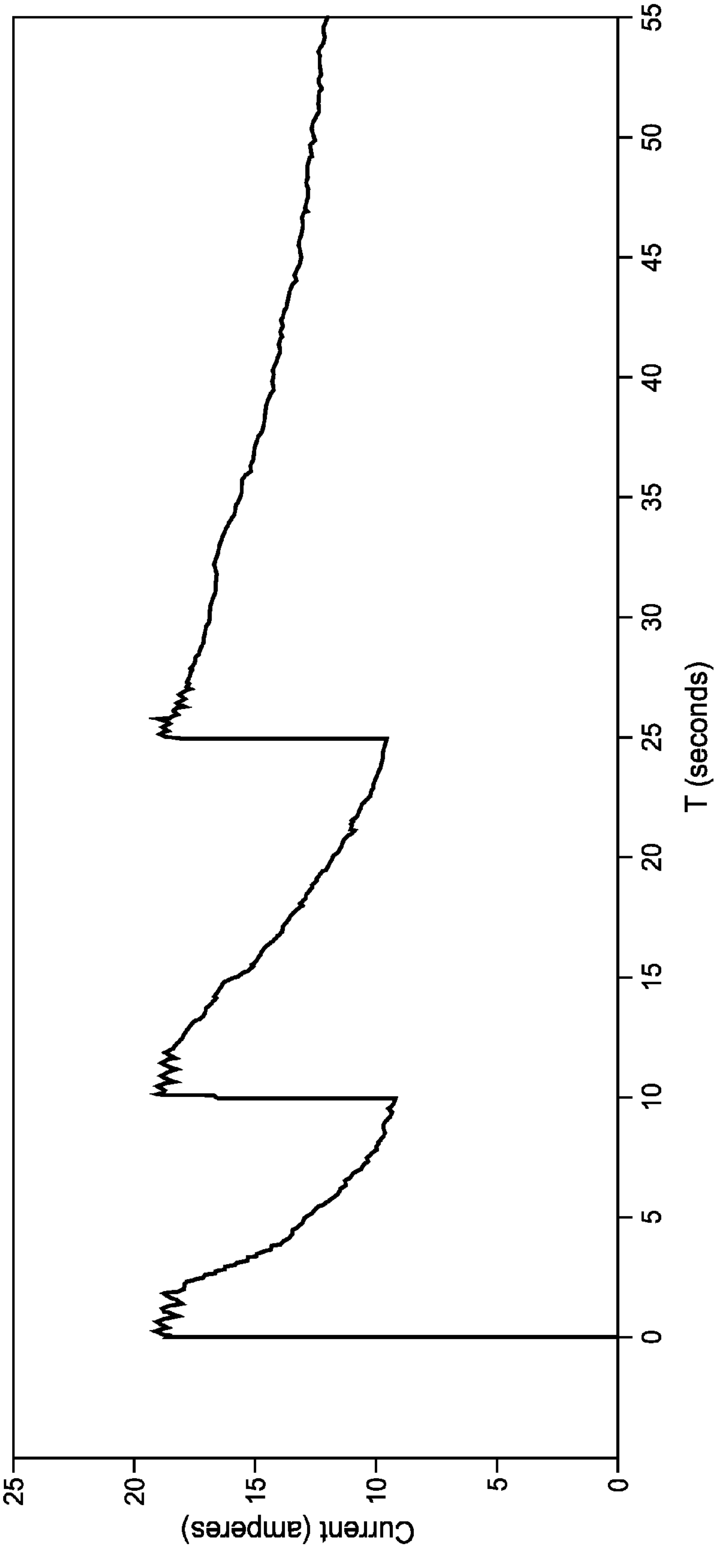
FIG. 4 is a graph showing the current draw of several HID lamps activated in accordance with an embodiment of the invention.

Step 706 then determines if the auxiliary electrical circuit 24 has capacity to handle more of the lamps. This is done by starting a countdown or otherwise delaying activation of more of the lamps for a pre-determined amount of time. FIG. 4 shows a current decay curve for the lamps 14-20 that illustrates an exemplary countdown or time delay sequence. When the lamps 14 and 16 are first activated at a time of 0 seconds, the lamps draw approximately 20 amps from the electrical circuit 24 as illustrated. After approximately 10 seconds, the current drawn by lamps 14 and 16 decays to approximately 10 amps. At this point, the auxiliary circuit 24 has capacity to handle activation of another lamp. Thus, in this embodiment, the first countdown period is approximately 10 seconds.

After the first countdown period has expired, step 708 activates the lamp 18. At this point (10 seconds), the combined current draw of lamps 14, 16, and 18 spikes to approximately 20 amps, as shown in the graph of FIG. 4. Step 710 then determines if the auxiliary electrical circuit has capacity to handle an additional lamp. This is done by starting another countdown or time delay. As shown in the graph of FIG. 4, the current drawn by lamps 14, 16, 18 drops to approximately 10 amps approximately 25 seconds after the first lamps are activated or 15 seconds after the third lamp is activated. Thus, in this embodiment, the second countdown is approximately 15 seconds.

After the second countdown has expired, step 712 activates the fourth lamp 38. Again, as shown in the graph of FIG. 4, the total current draw of lamps 14, 16, 18, and 20 spikes to approximately 20 amps and decays to a lower steady state value over time. The method 700 is not limited to the particular countdown periods, number of lamps, or activation sequence disclosed herein, as the principles of the method are equally applicable to other embodiments.

Although the invention has been described with reference to the embodiments illustrated in the attached drawings, it is noted that equivalents may be employed and substitutions made herein without departing from the scope of the invention as recited in the claims. For example, the methods disclosed herein and illustrated in FIGS. 5-7 may be performed in any order and steps may be added or deleted without departing from the scope of the invention as recited in the claims. Also, the scope of the invention is not limited to the particular number and type of lamps and the particular auxiliary electrical circuit described and illustrated herein, as the principles of the invention apply to any number and type of lamps and size of electrical circuit.

Having thus described an embodiment of the invention, what is claimed as new and desired to be protected by Letters Patent includes the following:

1. A lighting system for an agricultural vehicle, the lighting system comprising:

a plurality of HID lamps configured to be mounted to the agricultural vehicle and powered by an electrical circuit of the agricultural vehicle; and a lighting controller for controlling activation of the lamps, the lighting controller being configured to initially activate a first set of the lamps and to subsequently activate a second set of the lamps once it determines that the electrical circuit has the capacity to safely handle both the first and second sets of the lamps, wherein the lighting controller determines that the electrical circuit has sufficient capacity to safely handle both the first and second sets of the lamps by determining when current drawn from the first set of the lamps drops below a threshold current level.

2. The lighting system as set forth in claim 1, wherein the first set of lamps comprises one of the lamps or a pair of the lamps.

3. The lighting system as set forth in claim 1, wherein the second set of lamps comprises one of the lamps.

4. The lighting system as set forth in claim 1, wherein the electrical circuit has a maximum rated capacity of approximately 20 amps and wherein the threshold current level is approximately 10 amps.

5. The lighting system as set forth in claim 1, wherein the lighting controller determines that the electrical circuit has the capacity to safely handle both the first and second sets of the lamps by delaying activation of the second set of the lamps for a time period corresponding to a current decay characteristic of the lamps.

6. The lighting system as set forth in claim 5, wherein the time period is approximately 10 seconds measured from activation of the first set of the lamps.

7. The lighting system as set forth in claim 1, wherein the lighting controller is further operable to activate a third set of the lamps once it determines that the electrical circuit has the capacity to safely handle all of the first, second, and third sets of the lamps.

8. The lighting system as set forth in claim 7, wherein the lighting controller determines that the electrical circuit has the capacity to safely handle the first, second, and third sets of the lamps by determining when current drawn from the first and second sets of the lamps drops below a second threshold current level.

9. The lighting system as set forth in claim 8, wherein the electrical circuit has a maximum rated capacity of approximately 20 amps and wherein the second threshold current level is approximately 10 amps.

10. The lighting system as set forth in claim 7, wherein the lighting controller determines that the electrical circuit has the capacity to safely handle the first, second, and third sets of the lamps by delaying activation of the third set of the lamps for a second time period corresponding to a current decay characteristic of the lamps.

11. The lighting system as set forth in claim 10, wherein the second time period is approximately 25 seconds measured from activation of the first set of the lamps.

12. A method of activating a plurality of HID lamps mounted on an agricultural vehicle and powered by an electrical circuit of the agricultural vehicle, the method comprising:

activating a first set of the lamps with a lighting controller;

determining with the lighting controller if the electrical circuit has capacity to handle both the first set of the lamps and a second set of the lamps; and if the electrical circuit has capacity, activating the second set of the lamps with the lighting controller, wherein the lighting controller determines that the electrical circuit has sufficient capacity to safely handle both the first and second sets of the lamps by determining when current drawn from the first set of the lamps drops below a threshold current level.

13. The method as set forth in claim 12, wherein the first set of lamps comprises one of the lamps or a pair of the lamps.

14. The method as set forth in claim 12, wherein the second set of lamps comprises one of the lamps.

15. The method as set forth in claim 12, wherein the electrical circuit has a maximum rated capacity of approximately 20 amps and wherein the threshold current level is approximately 10 amps.

16. The method as set forth in claim 12, wherein the lighting controller determines that the electrical circuit has the capacity to safely handle both the first and second sets of the lamps by delaying activation of the second set of the lamps for a time period corresponding to a current decay characteristic of the lamps.

17. The method as set forth in claim 16, wherein the time period is approximately 10 seconds measured from activation of the first set of the lamps.

18. The method as set forth in claim 12, further comprising the step of activating a third set of the lamps with the lighting controller once the electrical circuit has the capacity to safely handle all of the first, second, and third sets of the lamps.

19. The method as set forth in claim 18, wherein the lighting controller determines that the electrical circuit has the capacity to safely handle both the first, second, and third sets of the lamps by determining when current drawn from the first and second sets of the lamps drops below a second threshold current level.

20. The method as set forth in claim 19, wherein the electrical circuit has a maximum rated capacity of approximately 20 amps and wherein the second threshold current level is approximately 10 amps.

21. The method as set forth in claim 18, wherein the lighting controller determines that the electrical circuit has the capacity to safely handle the first, second, and third sets of the lamps by delaying activation of the third set of the lamps for a second time period corresponding to a current decay characteristic of the lamps.

22. The method as set forth in claim 21, wherein the second time period is approximately 25 seconds measured from activation of the first set of the lamps.

* * * * *